United States Patent
Gillet et al.

(10) Patent No.: US 8,718,606 B2
(45) Date of Patent: May 6, 2014

(54) METHOD AND APPARATUS FOR USER INTERACTION WHILE DEVICE IS LOCKED

(75) Inventors: Elena Gillet, Helsinki (FI); Janne Mantyla, Espoo (FI)

(73) Assignee: Nokia Corporation, Espoo (FI)

(*) Notice: Subject to any disclaimer, the term of this patent is extended or adjusted under 35 U.S.C. 154(b) by 909 days.

(21) Appl. No.: 12/648,095

(22) Filed: Dec. 28, 2009

(65) Prior Publication Data

US 2011/0159844 A1    Jun. 30, 2011

(51) Int. Cl.
*H04M 1/66* (2006.01)
*H04M 1/68* (2006.01)
*H04M 3/16* (2006.01)

(52) U.S. Cl.
USPC .................. 455/411; 455/410; 455/419

(58) Field of Classification Search
USPC .......... 455/410–411, 418, 419, 420; 379/189, 379/161, 184, 194, 200
See application file for complete search history.

(56) References Cited

U.S. PATENT DOCUMENTS

| | | | |
|---|---|---|---|
| 6,662,023 B1 * | 12/2003 | Helle | 455/558 |
| 6,801,765 B1 | 10/2004 | Roo et al. | |
| 8,234,695 B2 * | 7/2012 | Eldridge et al. | 726/5 |
| 2004/0133812 A1 * | 7/2004 | Ohmori et al. | 713/202 |
| 2004/0203601 A1 | 10/2004 | Morriss et al. | |
| 2006/0041756 A1 * | 2/2006 | Ashok et al. | 713/183 |
| 2008/0076459 A1 * | 3/2008 | Shaju | 455/466 |
| 2009/0080662 A1 | 3/2009 | Thibadeau | |
| 2009/0164467 A1 | 6/2009 | Ala-Lahti | |

FOREIGN PATENT DOCUMENTS

| | | |
|---|---|---|
| CN | 1359487 A | 7/2002 |
| CN | 1692321 A | 11/2005 |
| JP | 2006-129267 A | 5/2006 |
| JP | 2008-278108 A | 11/2008 |
| KR | 20000040551 A | 7/2000 |
| KR | 20060129632 A | 12/2006 |
| WO | 00/16190 | 3/2000 |

OTHER PUBLICATIONS

International Search Report dated Mar. 17, 2011.
Written Opinion dated Mar. 17, 2011.
How do you recover your stolen mobile phone? | Malaysian Tech & Lifestyle Blogger [online] [retrieved Dec. 8, 2009]. Retrieved from the Internet: <URL: http://www.matblogger.com/2009/03/how-do-you-recover-your-stolen-mobilephone/>. 3 pages.
Canadian Office Action for Application No. 2,785,444, dated Oct. 9, 2013.
Office Action for Chinese Application No. CN 201080059530.3; dated Dec. 20, 2013.

* cited by examiner

*Primary Examiner* — Olumide T Ajibade Akonai
(74) *Attorney, Agent, or Firm* — Alston & Bird LLP (57) ABSTRACT

A method, apparatus, user interface and computer program product for detecting an invalid passcode state of a device when the device is in a locked state, prompting a communication from the device to a trusted contact while the device is in the locked state, the trusted contact being designated by the device, and transmitting the communication to the trusted contact with a lost passcode request while the device is in the locked state.

19 Claims, 10 Drawing Sheets

METHOD AND APPARATUS FOR USER INTERACTION WHILE DEVICE IS LOCKED

TECHNICAL FIELD

The aspects of the disclosed embodiments generally relate to communication devices, and in particular to operating a mobile communication device while the device is in a locked or restricted state.

BACKGROUND

The typical mobile communication device will utilize the concept of a "locked" state or mode, where the functions of the device are restricted or rendered inoperable. Generally, the locked state of a device such as a mobile communication device is intended to prevent misuse or inadvertent activation of the functions of the device. The locked state of the device can generally be automatically or manually activated. When manually activated, one or more keys of the device can be pressed, which activates or engages the locked state of the device. In the locked state, certain functions of the device are rendered inoperable, such as for example the keypad and outgoing call function. When a communication device is in a locked state, the user of the device is generally not able to make a call or send a message, or access applications of the device. In some cases, certain emergency calls to pre-designated emergency numbers are permitted, even when the device is in the locked state.

Generally, when a device is in a locked state, the device is enabled to receive incoming communications, such as incoming calls and messages. When an incoming communication is received, the device, in the locked state, is enabled so that the user can answer the call, view that a message has arrived, the number of message or otherwise accept the communication, depending upon the particular setup and functionality of the device.

To exit the locked state, or otherwise enable a device for normal functionality from the locked state, the user of the device has to "unlock" the device. This typically involves pressing one or more keys of the device, in sequence, or entering a passcode, also referred to as a lock code, personal identification code or "PIN" code. For example, some devices require that an "Unlock" and "Function" key be pressed sequentially in order to unlock the device. The user will generally also have the option to set a passcode that must be entered in order to unlock the device and exit the locked state.

When the device is in the locked state, in some instances, any attempt to use the device will generate a message displayed on the device that indicates the device is locked and will provide instructions on how to unlock the device. For example, on one typical device, pressing any key when the device is in the locked state will generate a temporary, warning message on the screen that states "Press Unlock and Function Key." On other devices, trying to use the device when in the locked state will cause a passcode entry screen to be displayed and allow the user to use certain keys of the device to enter the passcode. When the passcode is incorrectly entered, in some cases, the user will allowed a limited number of retries, or be prevented from further unlocking attempts.

Limiting the number of passcode entry attempts or otherwise locking the device can be beneficial to prevent misuse of the device. For example, if a device is lost, stolen or misplaced, the locking state and functions can prevent another's access to the functions, applications and information available on the device.

However, there can be one or more problems that arise related to device lock codes and passcodes, and the inability to make, calls or otherwise use the device while the device is in a locked state. For example, one problem that can arise is if the owner forgets the passcode. Without the code, the legitimate or otherwise authorized user is not able to unlock the device and prevented from using it. Depending on the user's situation, they may not have immediate access to the passcode. As another example, a user, while authorized to use a particular device, may not know the code, and yet needs to be able to make a call, or otherwise use the device. A further example is the case where the owner of the device has lost the device, or another user is in possession of the device. If the device is locked, the user cannot access the various functions or applications of the device in order to try and identify the device. The locked state of the device can prevent any searching of a contact list of the device, accessing a call list (e.g. last called or most called), or even searching for an "In case of emergency (ICE))" contact, that could be helpful in trying to reunite the device with its owner.

Accordingly, it would be desirable to address at least some of the problems identified above.

SUMMARY

Various aspects of examples of the invention are set out in the claims.

According to a first aspect a method includes detecting an invalid passcode state of a device while the device is in a locked state, prompting for a communication from the device to a trusted contact while the device is in the locked state, the trusted contact being designated by the device, and transmitting the communication to the trusted contact with a lost passcode request while the device is in the locked state.

According to a second aspect, an apparatus includes a processor configured to detect an invalid passcode state of the apparatus while the apparatus is in a locked state, prompt for a communication from the apparatus to a trusted contact while the apparatus is in the locked state, the trusted contact being designated by the apparatus, and transmit the communication to the trusted contact with a lost passcode request while the apparatus is in the locked state.

BRIEF DESCRIPTION OF THE DRAWINGS

For a more complete understanding of the example embodiments, reference is now made to the following descriptions taken in connection with the accompanying drawings, in which.

DETAILED DESCRIPTION OF THE DRAWINGS

Example embodiments of the present application and its potential advantages are understood by referring to FIGS. 1-6 of the drawings. Although the disclosed embodiments will be described with reference to the embodiments shown in the drawings and described below, it should be understood that these could be embodied in many alternate forms. In addition, any suitable size, shape or type of elements or materials could be used.

The aspects of the disclosed embodiments are generally directed to enabling a device 120 for certain use when the device 120 is in a locked state. When the device 120 is in a locked state and an invalid or lost passcode state is detected, the device 120 can be enabled for certain functionality or communication states.

Figure 1:
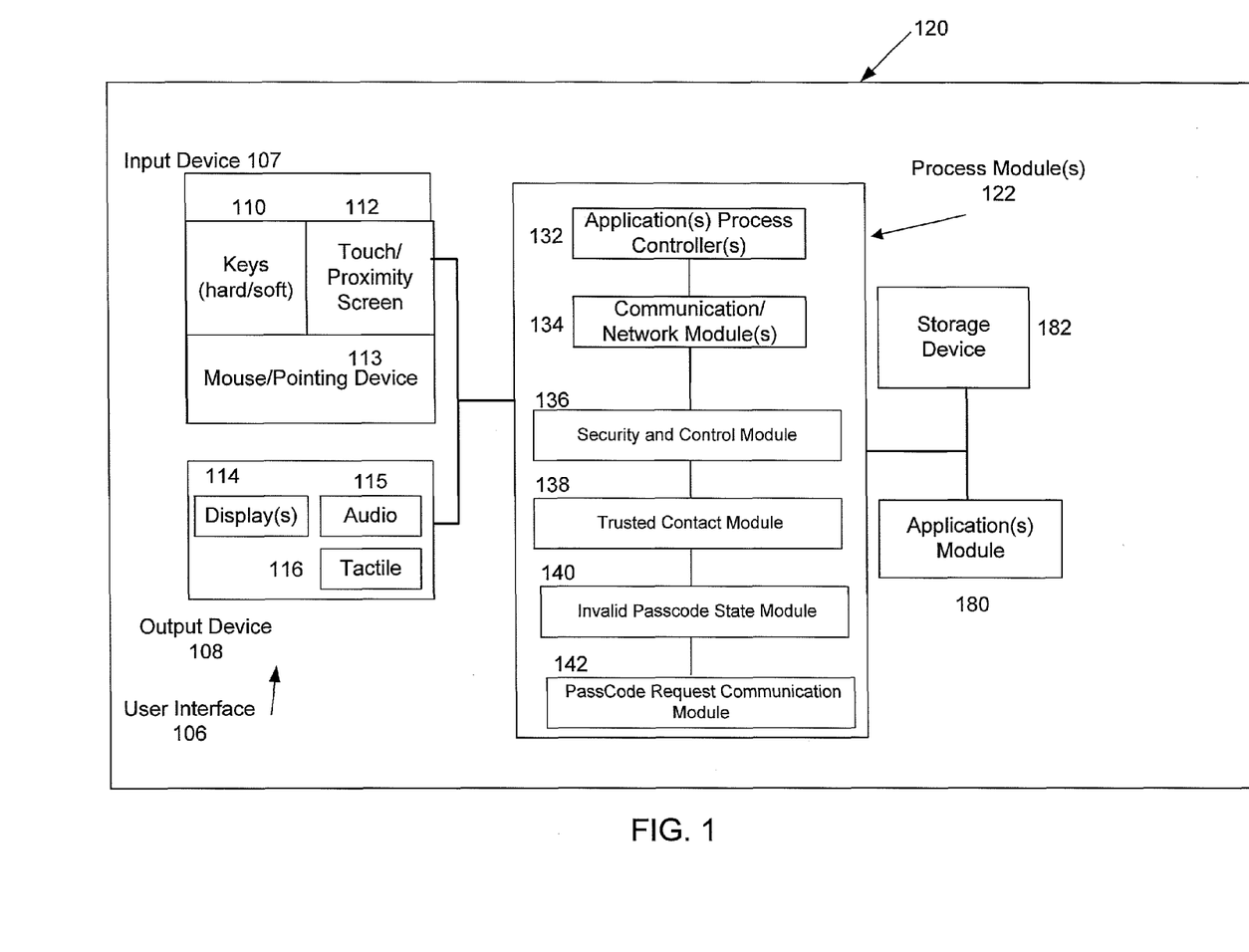
FIG. 1 is a block diagram of an exemplary device incorporating aspects of the disclosed embodiments.

FIG. 1 illustrates one embodiment of an exemplary communication device or apparatus 120 that can be used to practice aspects of the disclosed embodiments. The communication device 120 of FIG. 1 generally includes a user interface 106, process module(s) 122, application module(s) 180, and storage device(s) 182. In alternate embodiments, the device 120 can include other suitable systems, devices and components that enable use of a device 120 when in a locked state. The components described herein are merely exemplary and are not intended to encompass all components that can be included in, or used in conjunction with the device 120. The components described with respect to the device 120 will also include one or more processors or computer program products to execute the processes, methods, sequences, algorithms and instructions described herein.

The user interface 106 of the device 120 generally includes input device(s) 107 and output device(s) 108. The input device(s) 107 are generally configured to allow for the input of data, instructions, information gestures and commands to the device 120. The input device 107 can include one or a combination of devices such as, for example, but not limited to, keys or keypad 110, touch sensitive area 112 or proximity screen and a mouse or pointing device 113. In one embodiment, the keypad 110 can be a soft key or other such adaptive or dynamic device of a touch screen 112. The input device 107 can also be configured to receive input commands remotely or from another device that is not local to the device 120. The input device 107 can also include camera devices (not shown) or other such image capturing system(s).

The output device(s) 108 is generally configured to allow information and data to be presented to the user and can include one or more devices such as, for example, a display 114, audio device 115 and/or tactile output device 116. In one embodiment, the output device 108 can also be configured to transmit information to another device, which can be remote from the device 120. While the input device 107 and output device 108 are shown as separate devices, in one embodiment, the input device 107 and output device 108 can comprise a single device, such as for example a touch screen device, and be part of and form, the user interface 106. For example, in one embodiment where the user interface 106 includes a touch screen device, the touch sensitive screen or area 112 can also serve as an output device, providing functionality and displaying information, such as keypad or keypad elements and/or character outputs in the touch sensitive area of the display 114. While certain devices are shown in FIG. 1, the scope of the disclosed embodiments is not limited by any one or more of these devices, and alternate embodiments can include or exclude one or more devices shown.

The process module 122 is generally configured to execute the processes and methods of the aspects of the disclosed embodiments. The process module 122 can include hardware, software and application logic, or a combination thereof. As described herein, the process module 122 is generally configured to detect a invalid passcode state of a device 120, transmit a passcode communication request, and obtain the passcode so that a state of the device 120 can transition from the locked state to an unlocked state.

The application process controller 132 shown in FIG. 1 is generally configured to interface with the application module 180 and execute applications processes with respect to the other components and modules of the device 120. In one embodiment the application module 180 is configured to interface with applications that are stored either locally to or remote from the device 120. The application module 180 can include any one of a variety of applications that may be installed, configured or accessible by the device 120, such as for example, contact applications and databases, office and business applications, media player applications, multimedia applications, web browsers, global positioning applications, navigation and position systems, and map applications. The application module 180 can also include a voice recognition system that includes a text-to-speech module that allows the user to receive and input voice commands, prompts and instructions, through a suitable audio input device. In alternate embodiments, the application module 180 can include any suitable application that can be used by or utilized in the processes described herein.

The communication module 134 shown in FIG. 1 is generally configured to allow the device 120 to receive and send communications and data including for example, telephone calls, text messages, push to talk cellular service, location and position data, navigation information, chat messages, multimedia messages, video and email. The communications module 134 is also configured to receive information, data and communications from other devices and systems or networks, such as for example, the Internet. In one embodiment, the communications module 134 is configured to interface with, and establish communications connections with other services and applications using the Internet.

Figure 2A:
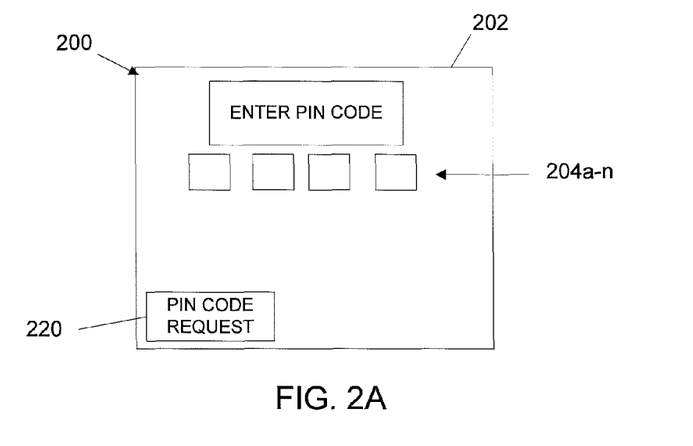
FIGS. 2A-2E are screenshots illustrating aspects of the disclosed embodiments.

The aspects of the disclosed embodiments are generally directed to a communication device 120 which is in a locked state, and for which the passcode is unknown to the user of the device 120, for any reason. This is generally referred to herein as an invalid or lost passcode state. FIG. 2A illustrates an exemplary screenshot 200 of a device 120 where a passcode entry screen 202 is displayed. In one embodiment, the invalid passcode state can be automatically activated or entered, after, for example, one or more invalid access (passcode entry) attempts. Alternatively, in another embodiment, the invalid passcode state can be manually activated by accessing a function, such as the PIN Code Request 220, that is presented on the passcode entry screen 202 of FIG. 2A. This manual activation can address the situation where the user of the device does not know the passcode and does not wish to waste time entering incorrect passcodes.

In the invalid passcode state, in one embodiment, the device 120 will be enabled for certain communications that will allow the user of the device 120 to obtain the passcode and unlock the device 120. In one embodiment, the device 120, while in a locked state, is enabled to establish a communication with a trusted contact in order to obtain the passcode. A "trusted contact", as that term is used herein, is generally intended to encompass any entity that the owner of the device 120 designates or otherwise entrusts to receive certain confidential information or other security aspects of the device 120, such as for example, the passcode. A "trusted contact" can include, but is not limited to, for example, spouses, close friends, colleagues and children.

In one embodiment, the owner of the device 120 designates one or more contacts as "trusted contacts." This can occur during a passcode setup phase for the device 120. For example, in one embodiment, the user of the device 120 can select one or more contacts from a contacts application (in the applications module 180) and select or otherwise designate the contact(s) as "trusted contacts." Although the contact application is described herein as being local to the device 120, such as in the applications module, in one embodiment, the contact application can be remote from the device 120. The contact details can include any suitable contact information including, for example, call numbers, messaging data or electronic mail data. In one embodiment, the contact details a trusted contact(s) can be entered or designated in any suitable fashion. For example, a specific entry field may be provided during the set-up process for entering the trusted contact(s) data. The data can be manually entered or imported from another application, for example.

In one embodiment, the contact details for each trusted contact, and an order in which each trusted contact is selected during a PIN code request 220, is stored in a trusted contact module 138. Alternatively, the trusted contact(s) details can be specifically marked or designated within a contact application, and the trusted contact module 138 can access the contact application, and identify the designated trusted contact(s) and/or retrieve the trusted contact details, when communication with a trusted contact is required during a PIN code request, as is described herein. In one embodiment, when the trusted contact(s) is designated in a contact application, the trusted contact module 138 can include links to the communication details or each designated contact rather than storing the contact details in the trusted contact module 138.

In one embodiment, the trusted contact(s) do not have to be specifically identified in a contact application or previously stored in the trusted contact module 138. Rather, in order to use more current contact information and data, a trusted contact(s) can be designated to be selected from a message or call log. For example, the trusted contact(s) can be one or more of a most used number(s) or a last used number(s). In this embodiment, when communication with a trusted contact is required, the trusted contact module 138 is configured to search one or more designated call logs, such as a "Recent Calls" call log to obtain the trusted contact data. Depending on the predetermined criteria, the trusted contact can be selected from the designated call log. For example, if the trusted contact criteria is the last used number(s), the contact details for the last call(s) will be retrieved by the trusted contact module 138 and used as the trusted contact. If the trusted contact criteria is the most used number, then that number(s) is designated as the trusted contact(s). Although call numbers are referred to herein, the criteria could also include message and email logs. In alternate embodiments, any suitable criteria can be used to designate and select a trusted contact(s). This allows the owner of the device 120 to rely on more up-to-date contact information, particularly when some amount of time may pass since a trusted contact is designated in a set-up process. For example, using the most called number or the last called number as the criteria might provide more confidence that the contact(s) corresponding to these numbers are available. Also, more than one number can be designated and retrieved in the event that one of the contacts is not available or a communication cannot be established. For example, in the event that a designated trusted contact cannot be reached or does not respond, and more than one trusted contact is designated or satisfies the trusted contact criteria, the next trusted contact on the list can be used. Thus, the aspects of the disclosed embodiments are not limited to the use of a specific trusted contact. The order in which trusted contacts are selected and designated can be according to any suitable criteria.

Figure 3A:
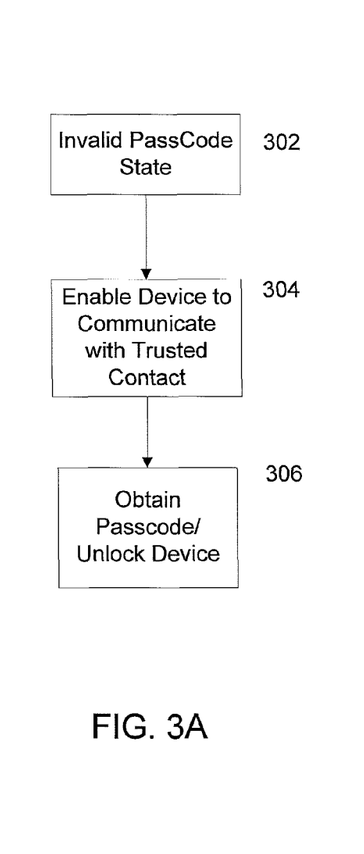
FIGS. 3A-3D are flowcharts illustrating aspects of the disclosed embodiments.

Referring to FIG. 3A, when an invalid passcode state is detected 302, in one embodiment, a communication to a trusted contact is enabled 304. In one embodiment, this corresponds to the Pin Code Request 220 described with respect to FIG. 2A. The communication to the trusted contact in the locked state of the device 120 is generally referred to herein as a "passcode communication request." The passcode communication request is generally configured to open a line of communication with the trusted contact and allow the trusted contact to verify the user of the device 120 and/or provide the passcode to the user. This enables the user of the device 120 to operate the device 120 to a limited extent, while the device 120 is in a locked state, to obtain passcode information, or otherwise communicate with a trusted contact. The passcode information can then be used to unlock 306 the device 120.

Figure 3B:
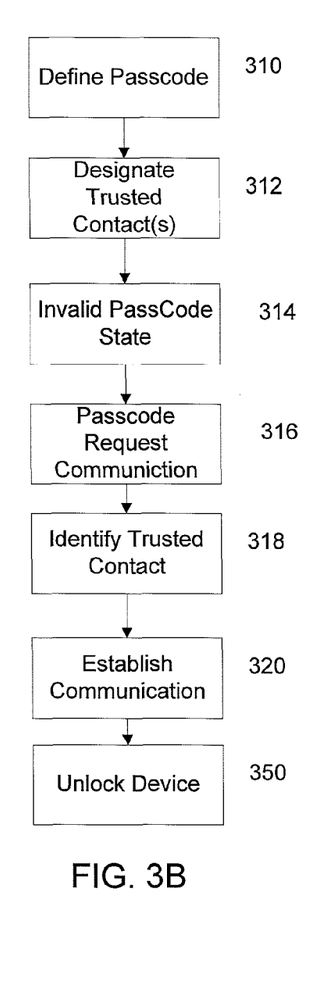

In one embodiment, referring to FIG. 3B, in a device set-up or other suitable state, the owner of the device 120 defines 310 a device lock code or passcode. In one embodiment, the device passcode can be stored in the security and control module 136 shown in FIG. 1. The security and control module 136 is generally configured to provide secure storage and other security features related to data that needs to be protected, is confidential or is otherwise used for security purposes. In alternate embodiments, the device passcode can be stored in any suitable facility that will generally provide secure storage of the passcode in accordance with the owner's specifications or requirements.

During the device set-up process, in one embodiment, the owner of the device 120 will select or designate 312 one or more trusted contacts. As described above, the trusted contact data can be stored in, or accessed by, the trusted contact module 138. Although the trusted contact module 138 is shown as a module that is separate from the security and control module 136, in one embodiment, the trusted contact module is part of the security and control module 136.

Figure 2B:
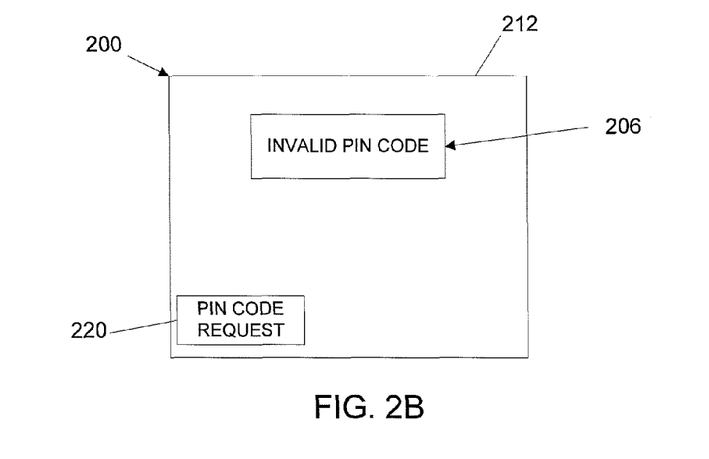

The invalid passcode state module 140 of FIG. 1 is generally configured to detect when an incorrect passcode attempt is made on the device 120. As shown in FIG. 2A, the passcode entry screen 202 includes one or more character entry fields 204a-n. The user will enter the passcode in this fields 204a-n. This can include one or more attempts, and the number of allowed attempts could be a function of a user setting. One or more incorrect password attempts can result in invalid passcode state 314 of the device 120. In one embodiment, as shown in FIG. 2B, a message 206 can be displayed that indicates on the screen 212 that the entered PIN code is invalid.

In response to the detection of the invalid passcode state 314, in one embodiment, a passcode request 316 is initiated. The passcode request 316 will communicate certain passcode related information to the trusted contact in order to obtain the passcode or otherwise unlock the device.

Referring to FIG. 2A, in one embodiment, the invalid passcode state module 140 is configured to provide a selectable PIN code request function 220 on the passcode entry screen 202 that allows the user of the device 120 to manually initiate the passcode request 316 communication. In one embodiment, selection or other activation of the PIN code request 220 shown in FIGS. 2A and 2B will result in the passcode stored in the Security and Control module 136 being sent to the trusted contact in a suitable message. Once the trusted contact receives the passcode, in one embodiment, the trusted contact can provide the user of the device 120 with the passcode so that the device 120 may be unlocked 450. The passcode can be provided to the user of the device 120 in any suitable fashion.

In the situation where the passcode is not known or an invalid passcode is entered, selection or suitable activation of the "Pin Code Request" field 220 shown in FIG. 2A will initiate the passcode request communication 316 as is described herein. As shown in FIG. 2A, in one embodiment, the Pin Request field 220 is presented together with the presentation of the PIN entry screen 202. In an alternate embodiment, the PIN request field 220 can be displayed after an invalid passcode attempt or state 314 is detected. Although the PIN request field 220 is shown in FIG. 2A as being displayed in conjunction with PIN entry screen 202, the aspects of the disclosed embodiments are not so limited, and a PIN request field can be displayed in any suitable manner and any suitable function or mechanism can be used to activate a passcode communication request 316 as is described herein. For example, in one embodiment, the passcode request communication 316 is automatically initiated upon the detection of an invalid passcode attempt or state. This mode limits the user interaction with the device 120 and the need to enable certain external functions of the device 120, such as buttons or keys 110, or touch screen 112.

The passcode communication request module 142 shown in FIG. 1 is generally configured to enable a passcode request communication 316 to be enabled or transmitted to a trusted contact when the device 120 is in a locked state. The communication options can include, but are not limited to for example, a voice call, a short message service, an electronic mail message or a Push to Talk over Cellular service, or any combination thereof.

In one embodiment, in response to the initiation of a passcode communication request 316, the passcode request communication module 142 identifies 318 a trusted contact from the trusted contact module 138. Although a single trusted contact is generally referred to herein, in alternate embodiments, any suitable number of trusted contacts could be identified and used. A communication is then transmitted or established 320 with the trusted contact in accordance with a selected or designated communication option.

In the situation where the communication 320 is voice call, the device 120 will initiate the call in a process that is generally understood. When the trusted contact answers the call, the user can explain the situation and ask for the passcode, if known by the trusted contact. In one embodiment, at least a portion of the voice call can include a pre-recorded message that identifies the call as a lost passcode or passcode request call. This limits the user interaction required to setup and establish the call or message and can immediately identify the purpose of the call or message.

Figure 2C:
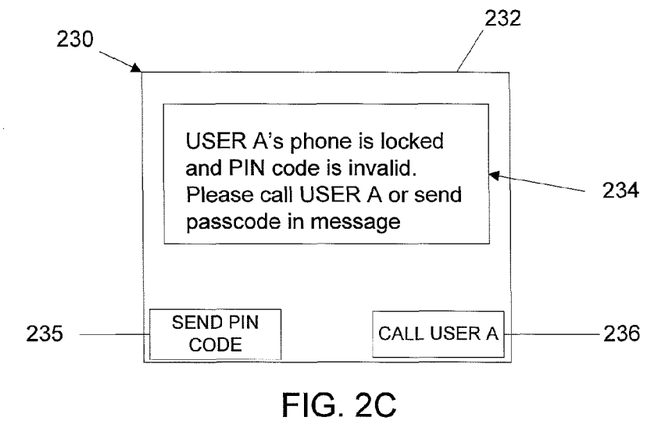
Figure 2D:
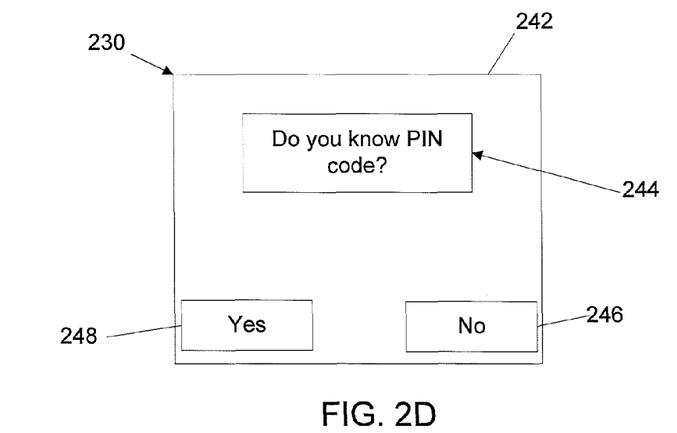
Figure 2E:
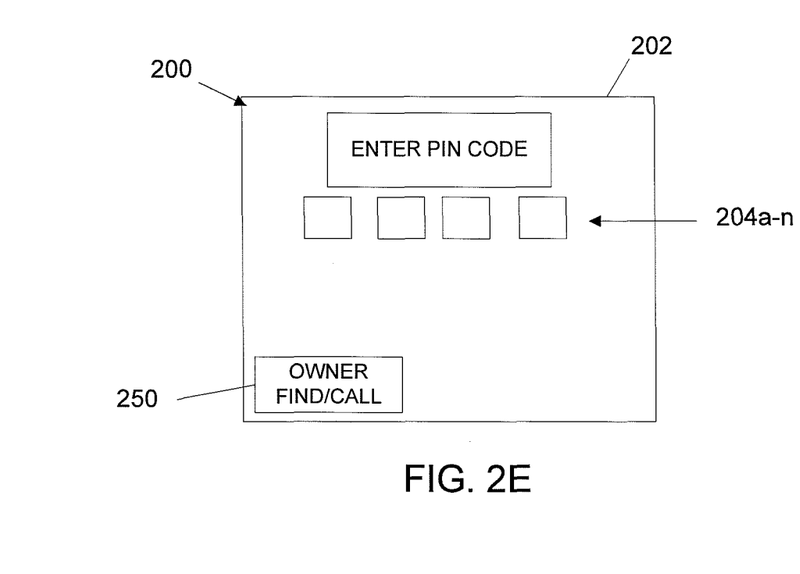

In another embodiment, the communication can be a short message service (SMS). When the PIN Request option 220 is selected, or the passcode request communication 316 is otherwise initiated, a message is created and sent to the trusted contact. The message can include any suitable information that identifies the situation to the trusted contact, similar to that described above. One example of such a message 234 is shown in screen 232 of FIG. 2C, which represents the display 230 of the trusted contact's device. The passcode can be included in this initial message, or can be provided in a subsequent message as is described herein. In one embodiment, the trusted contact can call the device 120 to establish communication with the user of the device 120 for purposes of providing the passcode. For example, as shown in FIG. 2C, the message 234 includes information indicating that the user of the device 120 needs the passcode for the device 120 and includes a request that the trusted contact call the user of the device 120. In one embodiment, the message is pre-defined, and includes information identifying the message as a passcode request message, and can also include an option 236 for the trusted contact to call the user or option 238 to send the passcode to the device 120.

Figure 3C:
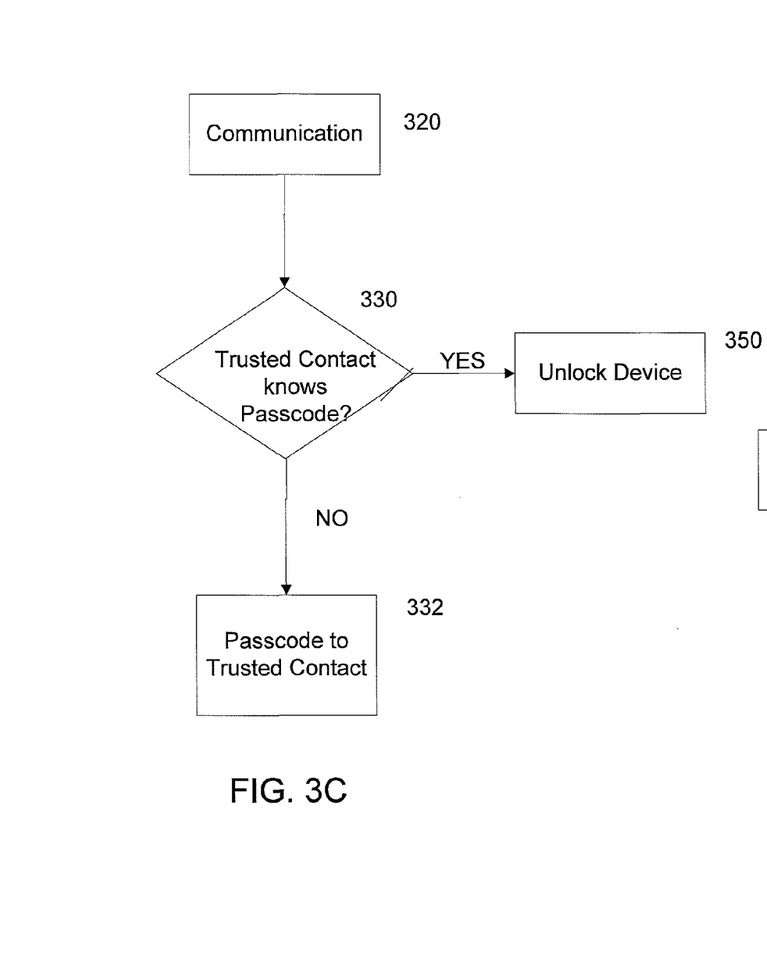
Figure 3D:
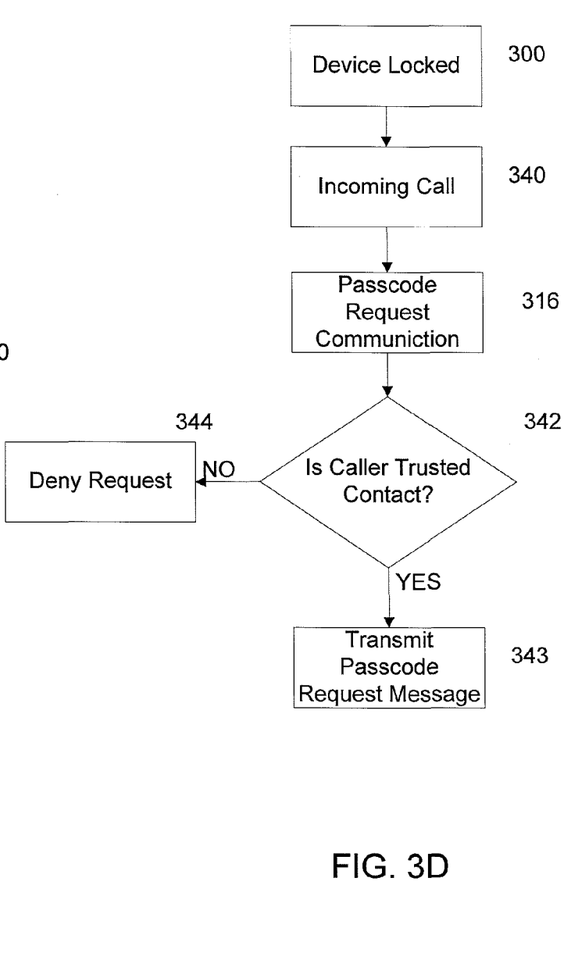

In one embodiment, referring to FIG. 3C, after the communication 320 is established, a determination 330 is made as to whether the trusted contact knows the passcode. For example, where the communication 320 is a SMS, the communication can include a message 244 asking whether the PIN code is known. Whether the passcode is known by the trusted contact can be indicated by selection of the "No" button 246 or "Yes" button 248. If "No" 246 is selected by the trusted contact, in one embodiment, the device 120 can automatically transmit 332 the passcode to the trusted contact.

The passcode can be transmitted 332 to the trusted contact in a SMS or other suitable message form. In this embodiment, the security and control module 136 provides the passcode for transmitting in the message. When the trusted contact receives the message with the passcode, the trusted contact can provide the passcode to the user or otherwise unlock 350 the device 120.

In one embodiment, if the trusted contact does not wish to divulge the passcode to the user of the device 120, the passcode can be transmitted from the trusted contact in a message, such as an encoded message, that is received by the device 120 and used to unlock the device 120. In this embodiment the user of the device 120 does not see or have access to the passcode. Rather, the passcode message sent by the trusted contact is interpreted by the security and control module 136 as being a passcode, and the contents of the passcode message are used to disable the locked state of, or unlock, the device 120. In one embodiment, the passcode message can have a pre-defined format that allows the security and control module 136 to interpret the message as a passcode message. In one embodiment, once the device 120 is unlocked by the incoming passcode message, the user of the device 120 can access and view the passcode in order to recover or otherwise retrieve the lost passcode.

In some situations, it may not be desirable to provide the passcode to the device 120 to the user, even though access to the device 120 may be needed or warranted. In one embodiment, a temporary password might be used. For example, when a PIN Request option 220 is selected or activated, the Security and Control module 136 can create a one-time passcode that will allow the user of the device 120 to use the device 120 for a limited period until the actual passcode is entered. The one-time password can be transmitted to the trusted contact, where it can in turn be provided to the user of the device 120. For example, a situation may arise where the user of the device 120 is not the owner, but is authorized, at least temporarily, to use the device 120. When the user activates the PIN Request 220, or otherwise initiates the passcode request communication 316, the Security and Control Module 136 creates and transmit a one-time passcode to the trusted contact. The trusted contact, upon receipt of the passcode request message can then relay or otherwise transmit the one-time passcode to the user of the device 120. The one-time passcode can then be used to unlock the device 120. In this example, the length of the unlocked state can be limited or the device 120 may only be enabled for use in a restricted mode. This can allow the device 120 to be utilized in a limited or restricted manner, without the need to divulge, or allow access to confidential or secure information and data, until the owner can confirm the use of the device 120 with the proper passcode.

In one embodiment, when the passcode request communication 316 is initialized, such as by selection of the PIN Request option 220, the device 120 can be also be enabled for establishing an outgoing voice call to the trusted contact. For example, the passcode request communication 316 is sent to the trusted contact as is described herein. The device 120, while still in a locked state, becomes enabled for an outgoing voice call to the trusted contact. The call can be automatically established by the device 120, or require selective activation by the user. The call contact details will be taken from the contact data associated with the trusted contact, which can be provided by the trusted contact module 138 or the corresponding contact application. This can allow the user to hasten the process of obtaining the passcode from the trusted contact, rather than waiting for a response to the passcode request communication 316 from the trusted contact.

Generally, even when a device 120 is in a locked state, the device 120 is enabled to receive incoming calls. The detection of an incoming call allows restricted use of the device 120, which is generally limited to answering the incoming call. In one embodiment, the passcode communication request 316 can be sent to a source of an incoming call. For example, referring to FIG. 3D, an incoming call is received 340 while the device 120 is in a locked state 300. The user of the device 120 initiates a passcode communication request 316, which is sent to the current caller. The caller can then obtain the passcode and use the passcode to enable the user to unlock 350 the device 120, as is described herein. In one embodiment, the passcode communication request 316 will only be sent 343 to the caller if the caller is identified 342 as a trusted contact. Otherwise the request is denied 344.

Figure 4A:
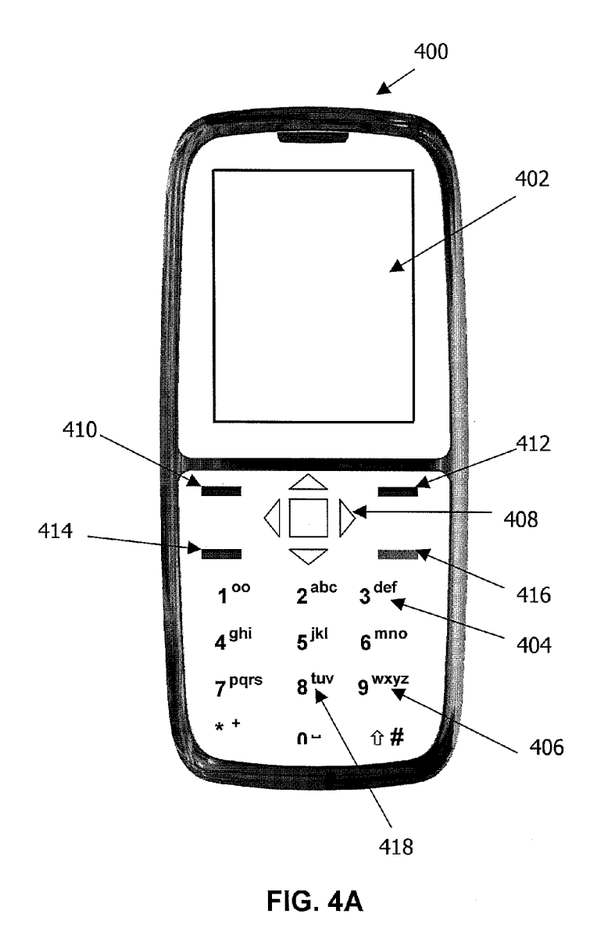
FIGS. 4A and 4B are illustrations of exemplary devices that can be used to practice aspects of the disclosed embodiments.
Figure 4B:
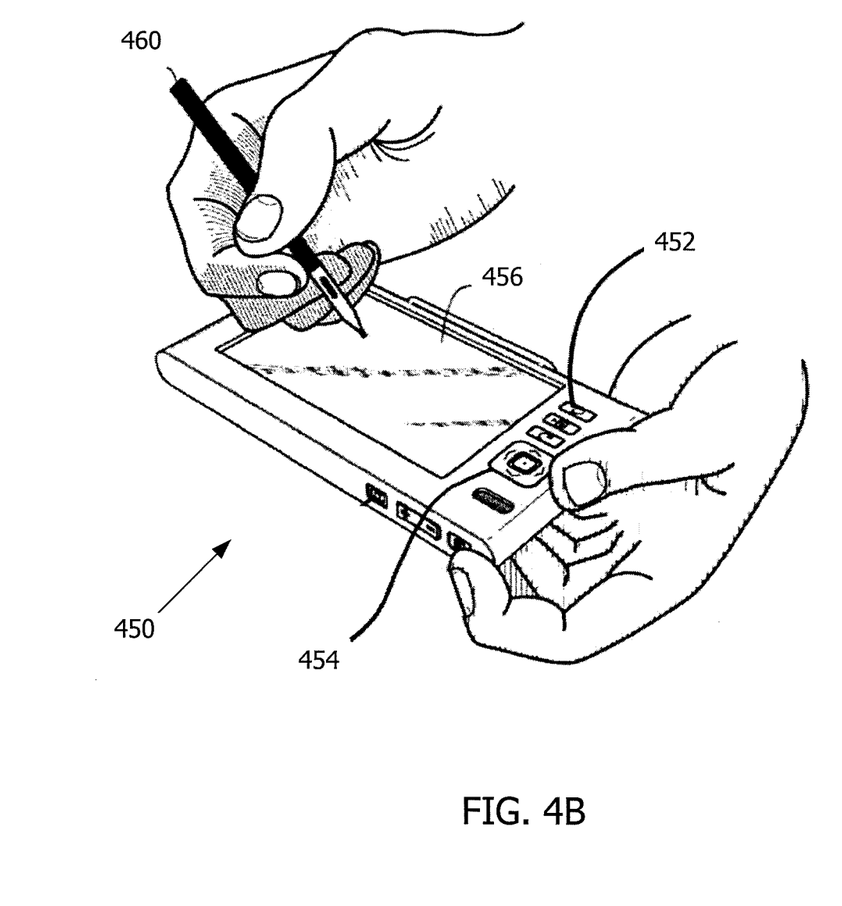

Some examples of devices on which aspects of the disclosed embodiments can be practiced are illustrated with respect to FIGS. 4A-4B. The devices are merely exemplary and are not intended to encompass all possible devices or all aspects of devices on which the disclosed embodiments can be practiced. The aspects of the disclosed embodiments can rely on very basic capabilities of devices and their user interface. Buttons or key inputs can be used for selecting the various selection criteria and links, and a scroll function can be used to move to and select item(s).

FIG. 4A illustrates one example of a device 400 that can be used to practice aspects of the disclosed embodiments. As shown in FIG. 4A, in one embodiment, the device 400 has a display area 402 and an input area 404. The input area 404 is generally in the form of a keypad. In one embodiment the input area 404 is touch sensitive. As noted herein, in one embodiment, the display area 402 can also have touch sensitive characteristics. Although the display 402 of FIG. 4A is shown being integral to the device 400, in alternate embodiments, the display 402 may be a peripheral display connected or coupled to the device 400.

In one embodiment, the keypad 406, in the form of soft keys, may include any suitable user input functions such as, for example, a multi-function/scroll key 408, soft keys 410, 412, call key 414, end key 416 and alphanumeric keys 418. In one embodiment, referring to FIG. 4B, the touch screen area 456 of device 450 can also present secondary functions, other than a keypad, using changing graphics.

As shown in FIG. 4B, in one embodiment, a pointing device, such as for example, a stylus 460, pen or simply the user's finger, may be used with the touch sensitive display 456. In alternate embodiments any suitable pointing device may be used. In other alternate embodiments, the display may be any suitable display, such as for example a flat display 456 that is typically made of a liquid crystal display (LCD) with optional back lighting, such as a thin film transistor (TFT) matrix capable of displaying color images.

The terms "select" and "touch" are generally described herein with respect to a touch screen-display. However, in alternate embodiments, the terms are intended to encompass the required user action with respect to other input devices. For example, with respect to a proximity screen device, it is not necessary for the user to make direct contact in order to select an object or other information. Thus, the above noted terms are intended to include that a user only needs to be within the proximity of the device to carry out the desired function.

Similarly, the scope of the intended devices is not limited to single touch or contact devices. Multi-touch devices, where contact by one or more fingers or other pointing devices can navigate on and about the screen, are also intended to be encompassed by the disclosed embodiments. Non-touch devices are also intended to be encompassed by the disclosed embodiments. Non-touch devices include, but are not limited to, devices without touch or proximity screens, where navigation on the display and menus of the various applications is performed through, for example, keys 110 of the system or through voice commands via voice recognition features of the system.

In one embodiment, the device 400 can include an image capture device such as a camera 420 (not shown) as a further input device. The device 400 may also include other suitable features such as, for example a loud speaker, tactile feedback devices or connectivity port. The mobile communications device may have a processor or other suitable computer program product connected or coupled to the display for processing user inputs and displaying information on the display 402 or touch sensitive area 456 of device 450. A computer readable storage device, such as a memory may be connected to the processor for storing any suitable information, data, settings and/or applications associated with each of the mobile communications devices 400 and 450.

Although the above embodiments are described as being implemented on and with a mobile communication device, it will be understood that the disclosed embodiments can be practiced on any suitable device incorporating a processor, memory and supporting software or hardware. For example, the disclosed embodiments can be implemented on various types of music, gaming and multimedia devices. In one embodiment, the device 120 of FIG. 1 may be for example, a personal digital assistant (PDA) style device 450 illustrated in FIG. 4B. The personal digital assistant 450 may have a keypad 452, cursor control 454, a touch screen display 456, and a pointing device 460 for use on the touch screen display 456. In one embodiment, the touch screen display 456 can include the QWERTY keypad as discussed herein. In still other alternate embodiments, the device may be a personal computer, a tablet computer, touch pad device, Internet tablet, a laptop or desktop computer, a mobile terminal, a cellular/mobile phone, a multimedia device, a personal communicator, a television set top box, a digital video/versatile disk (DVD) or high definition player or any other suitable device capable of containing for example a display and supported electronics such as a processor(s) and memory(s). In one embodiment, these devices will be Internet enabled and include GPS and map capabilities and functions.

Figure 5:
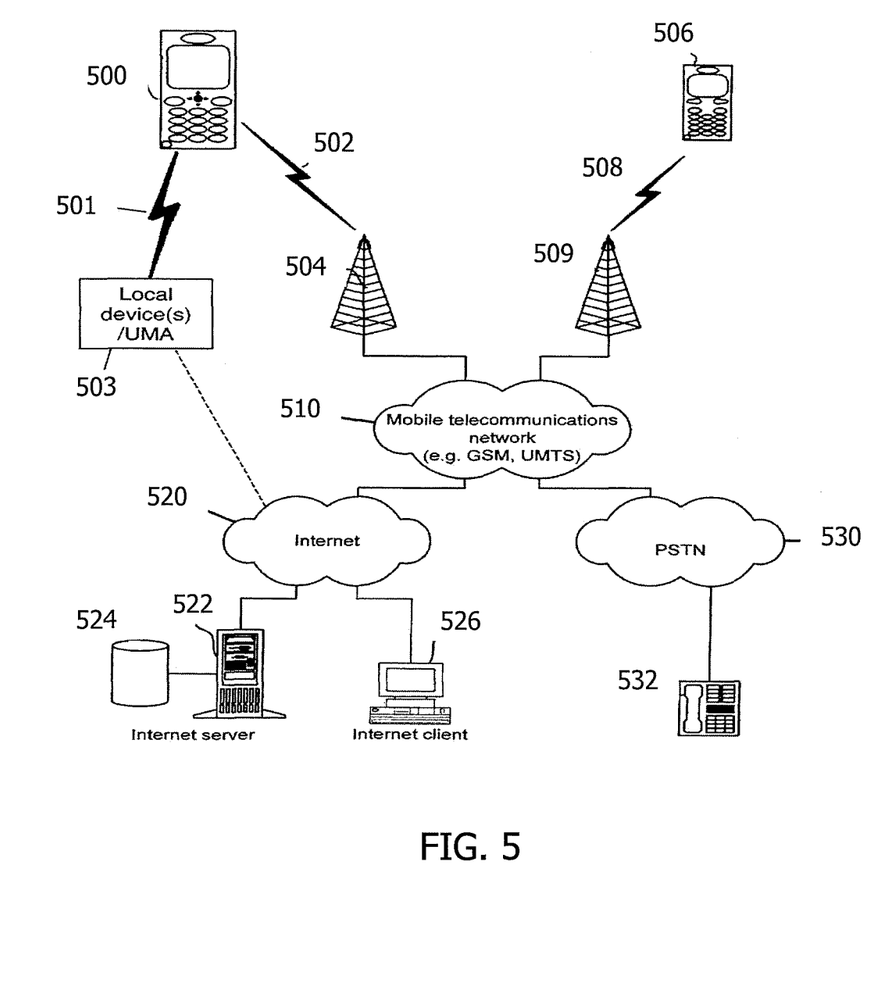
FIG. 5 illustrates a block diagram of an exemplary system incorporating features that may be used to practice aspects of the disclosed embodiments.

In the embodiment where the device 400 comprises a mobile communications device, the device can be adapted for communication in a telecommunication system, such as that shown in FIG. 5. In such a system, various telecommunications services such as cellular voice calls, worldwide web/wireless application protocol (www/wap) browsing, cellular video calls, data calls, facsimile transmissions, data transmissions, music transmissions, multimedia transmissions, still image transmission, video transmissions, electronic message transmissions and electronic commerce may be performed between the mobile terminal 500 and other devices, such as another mobile terminal 506, a line telephone 532, a personal computer (Internet client) 526 and/or an internet server 522.

It is to be noted that for different embodiments of the mobile device or terminal 500, and in different situations, some of the telecommunications services indicated above may or may not be available. The aspects of the disclosed embodiments are not limited to any particular set of services or communication, protocol or language in this respect.

The mobile terminals 500, 506 may be connected to a mobile telecommunications network 510 through radio frequency (RF) links 502, 508 via base stations 504, 509. The mobile telecommunications network 510 may be in compliance with any commercially available mobile telecommunications standard such as for example the global system for mobile communications (GSM), universal mobile telecommunication system (UMTS), digital advanced mobile phone service (D-AMPS), code division multiple access 2000 (CDMA2000), wideband code division multiple access (WCDMA), wireless local area network (WLAN), freedom of mobile multimedia access (FOMA) and time division-synchronous code division multiple access (TD-SCDMA).

The mobile telecommunications network 510 may be operatively connected to a wide-area network 520, which may be the Internet or a part thereof. An Internet server 522 has data storage 524 and is connected to the wide area network 520. The server 522 may host a worldwide web/wireless application protocol server capable of serving worldwide web/wireless application protocol content to the mobile terminal 500. The mobile terminal 500 can also be coupled to the Internet 520. In one embodiment, the mobile terminal 500 can be coupled to the Internet 520 via a wired or wireless link, such as a Universal Serial Bus (USB) or Bluetooth™ connection, for example.

A public switched telephone network (PSTN) 530 may be connected to the mobile telecommunications network 510 in a familiar manner. Various telephone terminals, including the stationary telephone 532, may be connected to the public switched telephone network 530.

The mobile terminal 500 is also capable of communicating locally via a local link 501 to one or more local devices 503. The local links 501 may be any suitable type of link or piconet with a limited range, such as for example Bluetooth™, a USB link, a wireless Universal Serial Bus (WUSB) link, an IEEE 802.11 wireless local area network (WLAN) link, an RS-232 serial link, etc. The local devices 503 can, for example, be various sensors that can communicate measurement values or other signals to the mobile terminal 500 over the local link 501. The above examples are not intended to be limiting and any suitable type of link or short range communication protocol may be utilized. The local devices 503 may be antennas and supporting equipment forming a wireless local area network implementing Worldwide Interoperability for Microwave Access (WiMAX, IEEE 802.16), WiFi (IEEE 802.11x) or other communication protocols. The wireless local area network may be connected to the Internet. The mobile terminal 500 may thus have multi-radio capability for connecting wirelessly using mobile communications network 510, wireless local area network or both. Communication with the mobile telecommunications network 510 may also be implemented using WiFi, Worldwide Interoperability for Microwave Access, or any other suitable protocols, and such communication may utilize unlicensed portions of the radio spectrum (e.g. unlicensed mobile access (UMA)). In one embodiment, the communication module 134 of FIG. 1 is configured to interact with, and communicate with, the system described with respect to FIG. 5.

Without in any way limiting the scope, interpretation, or application of the claims appearing below, a technical effect of the one or more example embodiments disclosed herein is allowing a device while in a locked state to send a communication including a passcode of the device to a trusted contact, wherein the trusted contact can then help the user to recover the passcode and unlock the device. Another technical effect of the one or more example embodiments disclosed herein is to allow a user to call the trusted contact while maintaining a limited call user interface on the locked device. Another technical effect of the one or more example embodiments is to allow the device passcode to be sent from the device to a current caller, even though the device is locked.

Figure 6:
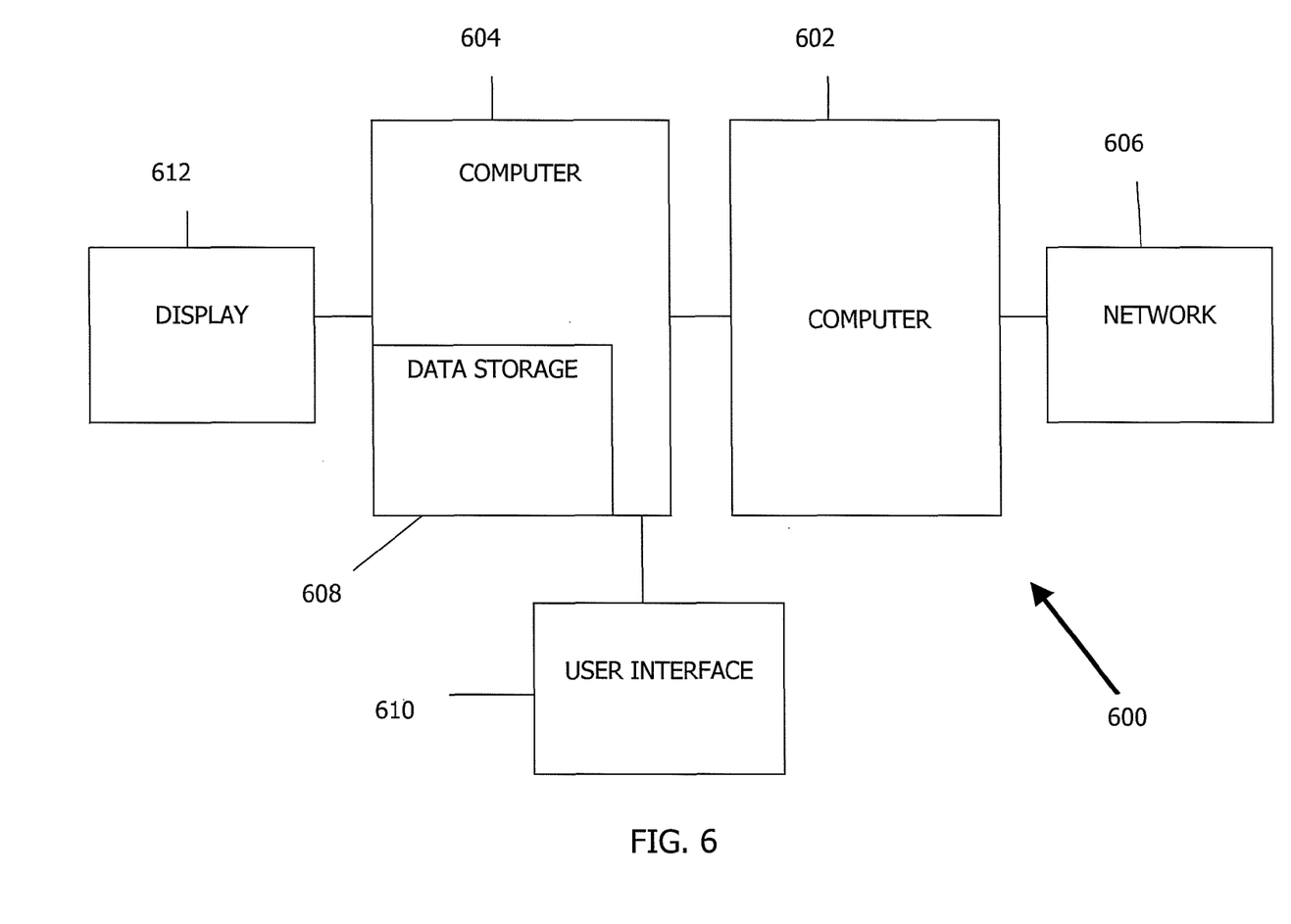
FIG. 6 is a block diagram illustrating the general architecture of an exemplary system in which the devices of FIGS. 4A and 4B may be used.

The aspects of the disclosed embodiments may be implemented in software, hardware, application logic or a combination of software hardware and application logic. The software, application logic and/or hardware may reside on one or more computers as shown in FIG. 6. If desired, part of the software, application logic and/or hardware may reside on one computer 602, while part of the software, application logic and/or hardware may reside on another computer 604. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 6. A computer-readable medium may comprise a computer readable storage medium that may be any media or means that can contain or store the instructions for use by or in connection with an instruction execution system, apparatus or device, such as a computer.

The disclosed embodiments may also include software and computer programs incorporating the process steps and instructions described above. In one embodiment, the programs incorporating the process steps described herein can be stored on or in a computer program product and executed in one or more computers. FIG. 6 is a block diagram of one embodiment of a typical apparatus 600 incorporating features that may be used to practice aspects of the invention. The apparatus 600 can include computer readable program code means embodied or stored on a computer readable storage medium for carrying out and executing the process steps described herein. In one embodiment the computer readable program code is stored in a memory(s) of the device. In alternate embodiments the computer readable program code can be stored in memory or other storage medium that is external to, or remote from, the apparatus 600. The memory can be direct coupled or wireless coupled to the apparatus 600. As shown, a computer system 602 may be linked to another computer system 604, such that the computers 602 and 604 are capable of sending information to each other and receiving information from each other. In one embodiment, computer system 602 could include a server computer adapted to communicate with a network 606. Alternatively, where only one computer system is used, such as computer 604, computer 604 will be configured to communicate with and interact with the network 606. Computer systems 602 and 604 can be linked together in any conventional manner including, for example, a modem, wireless, hard wire connection, or fiber optic link. Generally, information can be made available to both computer systems 602 and 604 using a communication protocol typically sent over a communication channel or other suitable connection or line, communication channel or link. In one embodiment, the communication channel comprises a suitable broad-band communication channel. Computers 602 and 604 are generally adapted to utilize program storage devices embodying machine-readable program source code, which is configured to cause the computers 602 and 604 to perform the method steps and processes disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks and semiconductor materials and chips.

Computer systems 602 and 604 may also include a microprocessor(s) for executing stored programs. Computer 602 may include a data storage device 608 on its program storage device for the storage of information and data. The computer program or software incorporating the processes and method steps incorporating aspects of the disclosed embodiments may be stored in one or more computers 602 and 604 on an otherwise conventional program storage device. In one embodiment, computers 602 and 604 may include a user interface 610, and/or a display interface 612 from which aspects of the invention can be accessed. The user interface 610 and the display interface 612, which in one embodiment can comprise a single interface, can be adapted to allow the input of queries and commands to the system, as well as present the results of the commands and queries, as described with reference to FIG. 1, for example.

The aspects of the disclosed embodiments provide for enabling interaction and use of a communication device when the communication device is in a locked mode. When the device passcode is not known, the aspects of the disclosed embodiments allow a user of the device to communicate, using the locked device, with a trusted contact in order to obtain the passcode. The communication with the trusted contact can include SMS messages that include the passcode or passcode related information that will allow the trusted contact to convey the passcode to the user. The device can also be enable to establish a voice call when a request for a passcode has been transmitted. Additionally, in one embodiment, the device can be enabled so that the user can send passcode request information to a current caller.

It is noted that the embodiments described herein can be used individually or in any combination thereof. If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the invention as defined in the appended claims.

What is claimed is:

1. A method comprising: providing for detection of, in a mobile communication device, an invalid passcode state of the mobile communication device while the mobile communication device is in a locked state; prompting a communication from the mobile communication device to a trusted contact while the mobile communication device is in the locked state, the trusted contact being designated by the mobile communication device; retrieving a passcode from a secure storage facility in the mobile communication device; and providing for transmission of the communication to the trusted contact with a lost passcode request while the mobile communication device is in the locked state, wherein the communication includes the retrieved passcode.

2. The method of claim 1 further comprising receiving a communication from the trusted contact in response to the transmitted communication that includes the passcode.

3. The method of claim 2 wherein the received communication is a Short Message Service, a voice call, a push to talk cellular service or an electronic mail message.

4. The method of claim 1 wherein the communication is automatically enabled after an invalid passcode entry.

5. The method of claim 1 further comprising, prior to receiving the communication with the passcode, verifying an authenticity of a user of the mobile communication device.

6. The method of claim 1, further comprising enabling the mobile communication device to establish a voice call only with the trusted contact while the mobile communication device is still in the locked mode after transmitting the communication from the mobile communication device to the trusted contact while the device is in the locked mode.

7. The method of claim 1 wherein the trusted contact is one of a pre-defined contact from a contact application, a most used contact, a last called contact or a contact group list.

8. The method of claim 1 wherein, the transmitted communication is a Short Message Service, a voice call, a push to talk cellular service or an electronic mail message.

9. The method of claim 1 further comprising that the communication to the trusted contact includes a one time password that can be used to unlock the mobile communication device and wherein the mobile communication device is enabled for restricted operation.

10. The method of claim 9 further comprising detecting receipt of a message in the mobile communication device that includes the one-time password and enabling the mobile communication device for restricted operation.

11. The method of claim 1 wherein the communication to the trusted contact is a pre-stored automated message that includes the lost passcode request.

12. The method of claim 1, further comprising, after detecting the invalid passcode state of the mobile communication device, detecting an incoming call, determining that the incoming call is from a trusted contact, and wherein the communication from the mobile communication device to the trusted contact is enabled.

13. An apparatus comprising at least one processor and at least one memory including computer program code, the at least one memory and the computer program code configured to, with the processor, cause the apparatus to at least:
detect an invalid passcode state of the apparatus while the apparatus is in a locked state;
prompt a communication from the apparatus to a trusted contact while the apparatus is in the locked state, the trusted contact being designated by the apparatus;
retrieve a passcode from a secure storage facility in the apparatus and provide for transmission of the communication to the trusted contact with a lost passcode request while the apparatus is in the locked state, wherein the communication includes the retrieved passcode.

14. The apparatus of claim 13 wherein the apparatus is further caused to detect a communication from the trusted contact in response to the transmitted communication that includes the passcode.

15. The apparatus of claim 14 wherein the apparatus is further caused to verify the passcode and automatically transition a state of the apparatus to an unlocked state if the passcode is valid.

16. The apparatus of claim 13 further comprising enabling the apparatus to establish a voice call only with the trusted contact while the apparatus is still in the locked mode after transmitting the communication to the trusted contact while the apparatus is in the locked mode.

17. The apparatus of claim 13 wherein the apparatus is further caused to include a one-time passcode in the lost password request, detect the one-time passcode in a message from the trusted contact, and automatically change a state of the apparatus to a restricted unlocked state.

18. A computer program product comprising at least one non-transitory computer readable storage medium bearing computer program code instructions stored therein, the computer-executable program code instructions comprising:

program code instructions for detecting, in a mobile communication device, an invalid passcode state of the mobile communication device while the device is in a locked state;

program code instructions for prompting a communication from the communication device to a trusted contact while the device is in the locked state, the trusted contact being designated by the device;

program code instructions to retrieve a passcode from a secure storage facility in the apparatus; and     program code instructions for transmitting the communication to the trusted contact with a lost passcode request while the device is in the locked state, wherein the communication includes the retrieved passcode.

19. The computer program product of claim 18 further comprising program code instructions for detecting a communication from the trusted contact in response to the transmitted communication that includes the passcode.

* * * * *